(12) United States Patent
Fong

(10) Patent No.: US 9,815,011 B2
(45) Date of Patent: Nov. 14, 2017

(54) DUST FILTER MOUNTED IN SEMICONDUCTOR WASTE GAS TREATMENT EQUIPMENT

(71) Applicant: ORIENT SERVICE CO., LTD., Taipei (TW)

(72) Inventor: Wu-Yu Fong, Taipei (TW)

(73) Assignee: ORIENT SERVICE CO., LTD., Taipei (TW)

( * ) Notice: Subject to any disclaimer, the term of this patent is extended or adjusted under 35 U.S.C. 154(b) by 0 days.

(21) Appl. No.: 15/051,975

(22) Filed: Feb. 24, 2016

(65) Prior Publication Data

US 2017/0151523 A1    Jun. 1, 2017

(30) Foreign Application Priority Data

Nov. 26, 2015    (TW) .............. 104139499 A

(51) Int. Cl.
*B01D 46/00* (2006.01)
*B01D 46/30* (2006.01)
*B01D 46/24* (2006.01)

(52) U.S. Cl.
CPC ....... *B01D 46/0023* (2013.01); *B01D 46/003* (2013.01); *B01D 46/0006* (2013.01); *B01D 46/24* (2013.01); *B01D 46/30* (2013.01); *B01D 2267/40* (2013.01); *B01D 2279/45* (2013.01)

(58) Field of Classification Search
CPC ... Y10S 261/72; B01D 53/0454; B01D 53/40; B01D 53/96; B01J 20/165; B01J 20/18; B01J 20/20; B01J 20/3408; B01J 20/3416; B01J 20/3475

See application file for complete search history.

(56) References Cited

U.S. PATENT DOCUMENTS

| | | | | |
|---|---|---|---|---|
| 556,040 A | * | 3/1896 | Alberger | B01J 19/30 159/13.1 |
| 598,351 A | * | 2/1898 | AStaub | B01D 47/06 261/108 |
| 1,293,270 A | * | 2/1919 | Webb | B01J 19/30 261/95 |
| 1,307,635 A | * | 6/1919 | Nielsen | B01J 19/30 138/37 |
| 1,365,671 A | * | 1/1921 | Fairlie | B01J 19/30 261/95 |
| 1,676,451 A | * | 7/1928 | Friedrich | F23M 20/00 261/95 |
| 1,715,252 A | * | 5/1929 | Sperr, Jr. | B01D 47/06 164/DIG. 1 |

(Continued)

*Primary Examiner* — Amber R Orlando
*Assistant Examiner* — Britanny Precht
(74) *Attorney, Agent, or Firm* — Chun-Ming Shih

(57) ABSTRACT

A dust filter mounted in a semiconductor waste gas treatment equipment comprising a housing having a chamber in the housing for passing a gas containing a water molecular and a dust through; and one or more main filtration boxes which can be implanted into the chamber by withdrawing way. One or more capturing rings and a filtering cotton for filtering the water molecular and the dust from the gas being disposed in the main filtration box, and the gas being sequentially passed through the capturing ring and the filtering cotton. It is an objective to solve a problem saying that it is not easy to clean the conventional dust filter because the structure of it is too complex.

6 Claims, 3 Drawing Sheets

(56) References Cited

U.S. PATENT DOCUMENTS

| | | | | |
|---|---|---|---|---|
| 1,796,501 A * | 3/1931 | Ernst | B01J 19/30 | 261/94 |
| 1,848,576 A * | 3/1932 | Sandel | F24F 3/16 | 261/98 |
| 1,947,777 A * | 2/1934 | Huff | B01J 19/32 | 261/94 |
| 2,183,657 A * | 12/1939 | Page | C02F 3/101 | 210/150 |
| 2,834,466 A * | 5/1958 | Hament | C02F 1/645 | 210/120 |
| 3,266,787 A * | 8/1966 | Eckert | B01J 19/30 | 261/94 |
| 3,956,128 A * | 5/1976 | Turner | B01J 19/30 | 210/150 |
| 3,957,931 A * | 5/1976 | Ellis | B01J 19/30 | 210/150 |
| 4,343,320 A * | 8/1982 | Muto | A24D 3/045 | 131/210 |
| 4,481,155 A * | 11/1984 | Frohwerk | B01J 19/32 | 261/94 |
| 4,600,544 A * | 7/1986 | Mix | B01F 5/0616 | 202/158 |
| 4,749,493 A * | 6/1988 | Hicks | A01K 63/042 | 210/150 |
| 4,790,327 A * | 12/1988 | Despotis | A61M 16/0488 | 128/205.23 |
| 4,806,288 A * | 2/1989 | Nowosinski | B01J 19/30 | 261/94 |
| 5,225,116 A * | 7/1993 | Menzel | B01J 19/32 | 261/94 |
| 5,314,645 A * | 5/1994 | Rukovena | B01J 19/30 | 261/94 |
| 5,385,592 A * | 1/1995 | Maeda | B01D 46/0023 | 55/323 |
| 5,885,489 A * | 3/1999 | Horner | B01J 19/30 | 261/94 |
| 6,391,099 B1 * | 5/2002 | Ina | B01D 47/10 | 261/DIG. 54 |
| 2002/0122750 A1 * | 9/2002 | Kanno | B01D 53/68 | 422/171 |
| 2004/0031584 A1 * | 2/2004 | Zich | B01J 19/32 | 165/4 |
| 2006/0100090 A1 * | 5/2006 | Shen | B01D 53/0454 | 502/25 |
| 2006/0144241 A1 * | 7/2006 | Fukagawa | B01D 19/0005 | 96/242 |

* cited by examiner

DUST FILTER MOUNTED IN SEMICONDUCTOR WASTE GAS TREATMENT EQUIPMENT

BACKGROUND OF THE INVENTION

1. Field of the Invention

The present invention relates to a structural technique of a dust filter, especially to a dust filter mounted in a semiconductor waste gas treatment equipment.

2. Description of Related Art

In conventional semiconductor processes, many harmful waste gases, such as, a monosilane, a chlorine gas, perfluorinated compounds, etc, will be produced. In order to prevent the waste gases from damaging external environment and public benefits, the damaging substances in the waste gases should be cleaned and removed so as to be emitted into the external atmosphere.

For conventional methods for treating a waste gas in a semiconductor process, the waste gases are injected into a waste gas treatment equipment, burned in high temperature flame and mixed with a high temperature gas to form a high temperature waste gas and to force the damaging substances in the high temperature waste gas into catalytic transition of high temperature, and decomposed into non-harmful substances. Thus, the water soluble harmful substances, such as, Chlorofluorocarbon, etc, in the waste gas are dissolved in water by using a sprinkling device in the waste gas treatment equipment, and the waste gas is transformed into non-harmful gas. After the gas is cooled to be emitted into the external atmosphere, the environment is polluted. Generally, before the gas is emitted into the external atmosphere, it is necessary to screen the gas by using a dust filter so as to eliminate and remove water molecular and dust in the gas.

For the current treatment techniques, the dust filter is generally a so-called cyclone filtering device. The gas is passed through the cyclone filtering device to use centrifugal force and inertia produced by a whirl rotation in the dust filter. The water molecular and dusts in the gas are separated from the gas by using a principle saying that both a specific density of the water molecular and a specific density of the dust are higher than that of gas so as to remove the water molecular and the dusts from the gas.

Because we want to obtain better effects of filtering the water molecular and the dusts from the gas by using the cyclone filtering device, an air blower is needed and a vortex air guide channel having a complex structure is needed to be constructed. Thus, gas is driven and forced to flow through the vortex air guide channel by means of the air blower to filter the water molecular and the dusts from the gas. However, it is not easy to clean the cyclone filtering device because the structure of the cyclone filtering device is too complex.

SUMMARY OF THE INVENTION

It is an objective of the present invention to solve a problem saying that it is not easy to clean the conventional dust filter because the structure of it is too complex.

In order to solve the problem, it is another objective of the present invention to provide a dust filter mounted in a semiconductor waste gas treatment equipment comprising:

a housing having a chamber in the housing for passing a gas containing a water molecular and a dust through; and one or more main filtration boxes which can be implanted into the chamber by withdrawing way, one or more capturing rings and filtering cotton for filtering the water molecular and the dust from the gas being disposed in the main filtration box, and the gas being sequentially passed through the capturing ring and the filtering cotton.

According to the present invention, a shape of the capturing ring is preferably spiral ring shape and the capturing ring preferably has an axis line.

According to the present invention, the capturing ring preferably has a plurality of tongue strips formed on a circumferential wall of the capturing ring extending at a direction of the axis line.

According to the present invention, the tongue strip is preferably of wavy shape.

According to the present invention, the one or more capturing rings are preferably arranged in an array way alternatively and axis lines of the one or more capturing rings are preferably mutually parallel.

According to the present invention, the one or more capturing rings are preferably arranged in a two layer structure and the axis lines of the one or more capturing rings are preferably not staggered.

According to the present invention, the main filtration box preferably comprises a first filtration box and a second filtration box and the first filtration box and the second filtration box are spaced apart from each other in the chamber.

In accordance to the above technical plan, the technical effects of the present invention are that the harmful substances dissolvable in water are removed in the waste gas treatment equipment of the present invention to produce a non-harmful gas. The gas in the waste gas treatment equipment can be guided and moved through a structure of the dust filter by natural draining pressure of the gas without usage of an air blower for driving and pushing the gas to move forward. The structure of the dust filter is effectively simplified. The main filtration boxes can be designed to be implanted into the chamber by withdrawing way for facilitating withdrawal of the main filtration box. For cleaning and dust clearing operation by the capturing rings and filtering cotton, the cleaned main filtration box is pushed into the housing to increase convenience of dust filter cleaning.

Other objectives, advantages, and novel features of the invention will become more apparent from the following detailed description when taken in conjunction with the accompanying drawings.

DETAILED DESCRIPTION OF THE PREFERRED EMBODIMENT

The scope and contents of the present invention are not limited to a scope of the following examples.

Figure 1:
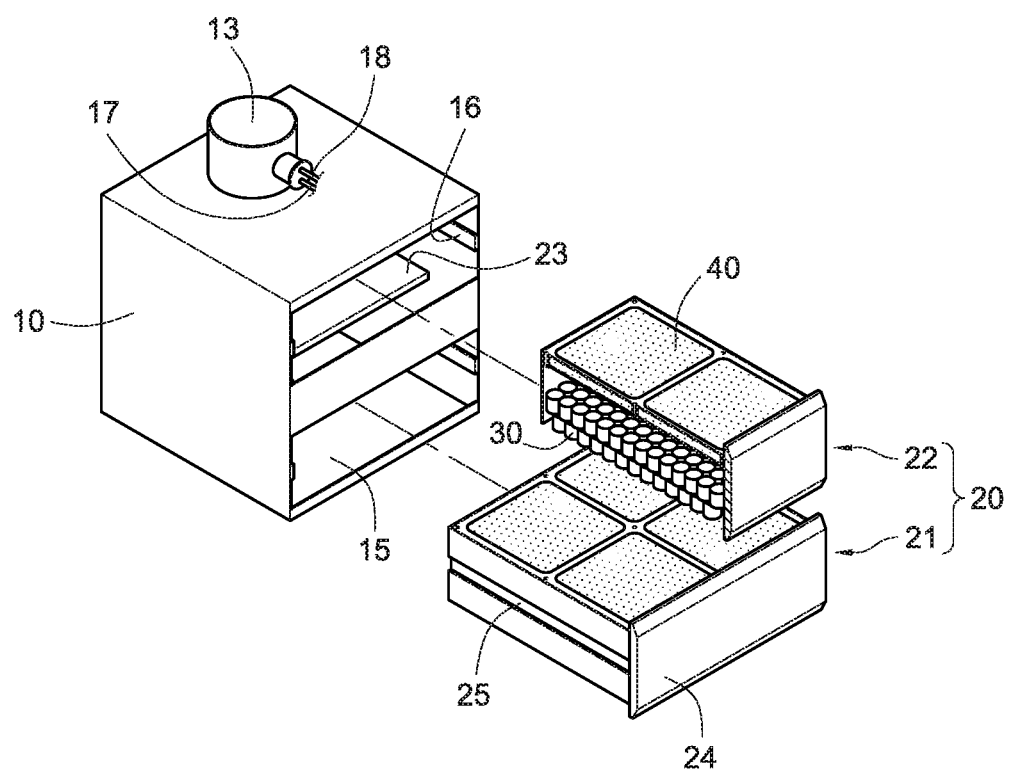
FIG. 1 is a three-dimensional explosive diagram of a dust filter mounted in a semiconductor waste gas treatment equipment of the present invention.
Figure 2:
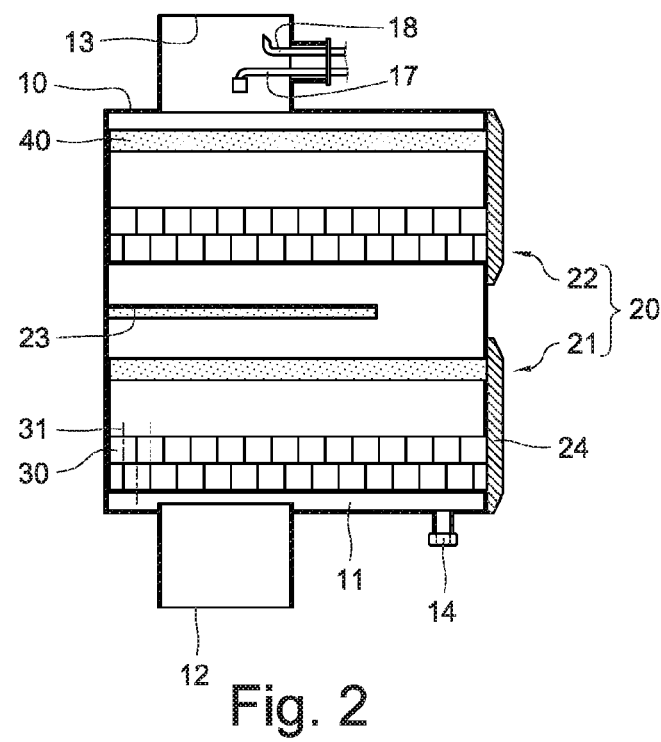
FIG. 2 a cross-section view showing combined structure of FIG. 1 of the present invention.

Please refer to FIGS. 1 and 2 which demonstrate a preferred embodiment of the present invention. The dust filter mounted in a semiconductor waste gas treatment equipment of the present invention comprises a housing 10 and at least one main filtration box 20.

The housing 10 can be made by screwing or welding a metal plate (such as a stainless steel plate). A chamber 11 is formed in the housing 10. An incoming gas end 12 and an outgas end 13 for connecting to the chamber 11 are respectively formed on a surface of the housing 10 so that a gas can enter the chamber 11 through the incoming gas end 12 and exits from the outgas end 13. The term "gas" used in the present invention means that a non-harmful gas is produced after a waste gas generated in a semiconductor process is heated and water cleaned.

The main filtration box 20 is inserted into the chamber 11 of the housing 10. An opening 15 is formed at one side of the housing 10. The main filtration box 20 is inserted into the chamber 11 via the opening 15. In an example, a sliding rail 16 extending toward the chamber 11 is disposed at the opening 15 of the housing 10. A pair of guide slots 25 corresponding to the sliding rail 16 are respectively formed at both sides of the main filtration box 20. After the main filtration box 20 is guided by the sliding rail 16 and the guide slots 25, the main filtration box 20 is inserted into the chamber 11 via the opening 15. In other words, by means of the above design, the main filtration box 20 is removable and is inserted into the chamber 11 or is withdrawn from the chamber 11.

A cover 24 is disposed at one side of the main filtration box 20. An area of the cover 24 is larger than that of the opening 15. When the main filtration box 20 is inserted into the chamber 11, the opening 15 is covered by the cover 24 in order to preventing the gas from leaking to the outside through a gap located between the opening 15 and the main filtration box 20. A handle (not shown) is disposed on the cover 24 during implementation. By the handle the main filtration box 20 is inserted into the chamber 11 or is withdrawn from the chamber 11.

A plurality of capturing rings 30 and a filtering cotton 40 are disposed in the main filtration box 20 in an example. For the capturing rings 30 and the filtering cotton 40 two passages of filter material for filtering water molecular and dusts in the gas are formed in the main filtration box 20. When the gas moves through the main filtration box 20, the water molecular and dusts in the gas are removed by passing through the capturing rings and the filtering cotton 40.

Figure 3:
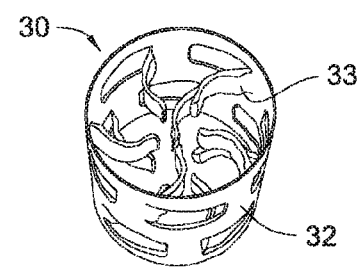
FIG. 3 is a three-dimensional schematic diagram showing a capturing ring according to the invention.

Please refer to FIGS. 2 and 3 which demonstrate the capturing ring 30 can be made by bending a metal plate. An axis line 31 is shown on the capturing ring 30. A fluid passage for passing the gas is formed in the capturing ring 30 extending along the axis line 31. In one example, a plurality of tongue strips 33 extending in a direction toward the axis are formed on an annual wall 32 of the capturing ring 30. The tongue strip 33 has a function of increasing a contact surface of the capturing ring 30 contacting with the gas. In one example, a shape of the tongue strip 33 is wavy. In more details, the tongue strip 33 in the example is made by punching the annual wall 32 of the capturing ring 30. For the tongue strip 33 the adherence of water molecular on a metal surface is used to capture the water molecular and dusts in the gas.

Figure 4:
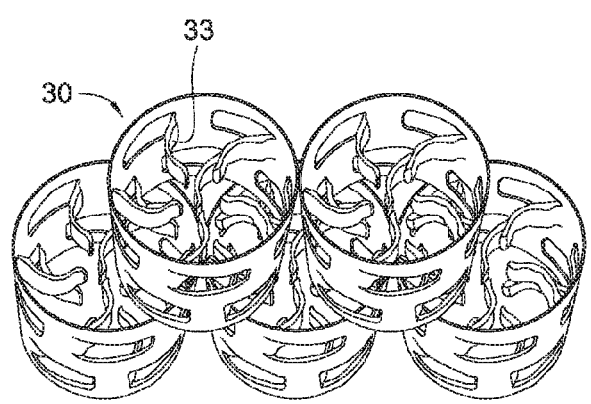
FIG. 4 a three-dimensional schematic diagram showing stacked structure of FIG. 3 of the capturing ring of the present invention.

Please refer to FIGS. 1 and 2 which demonstrate a staggered array arrangement of the capturing rings 30 disposed in the main filtration box 20 so that the axis lines 31 of the capturing rings 30 are mutually parallel. The fluid passages in the capturing rings 30 are aligned at the same direction in order to facilitating moving of the gas through the capturing rings 30. In other word, please refer to FIG. 4 which demonstrates that the capturing rings 30 are arranged in two layer structure. The directions of the axis lines 31 of the capturing rings 30 are not intersected so that the appearance of the capturing rings 30 are staggered in order to increase a contact area between the tongue strips 33 in the capturing rings 30 and the gas and to increase effect of capturing a water molecular and a dust from the gas by the capturing rings 30.

The main filtration box 20 in an example comprises a first filtration box 21 and a second filtration box 22. The first filtration box 21 and the second filtration box are spaced apart from each other and disposed in the chamber 11. The effect of filtering the water molecular and the dusts from the gas by disposing the first filtration box 21 and the second filtration box 22 in the chamber 11 is increased. In one embodiment, a spacer plate 23 is disposed between first filtration box 21 and the second filtration box 22 in the chamber 11. The spacer plate 23 is used for increasing duration and lengthening a moving route of the gas passing through the chamber 11. The filtering cotton is disposed on spacer plate 23 to increase the effect of filtering the water molecular and the dusts from the gas.

After the water molecular and the dusts are filtered from the gas by the capturing rings 30 and the filtering cotton 40, the water molecular accumulated on the capturing rings 30 and the filtering cotton 40 will condense into water which drops to a bottom of the chamber 11. In order to avoid overflowing of the water to other location (such as, waste gas treatment equipment) because of too much amount of water accumulated, it is necessary to disposing a draining outlet 14 for draining water at a bottom of the housing 10. A nozzle 17 of a clean dry air and a pressure detecting meter 18 are disposed near the outgas end 13 of the housing 10. The nozzle 17 of the clean dry air can release dry dean gas which is mixed with the gas flowing to the outgas end 13. The pressure detecting meter 18 is used for detecting a pressure value of the gas moving through the outgas end 13.

Figure 5:
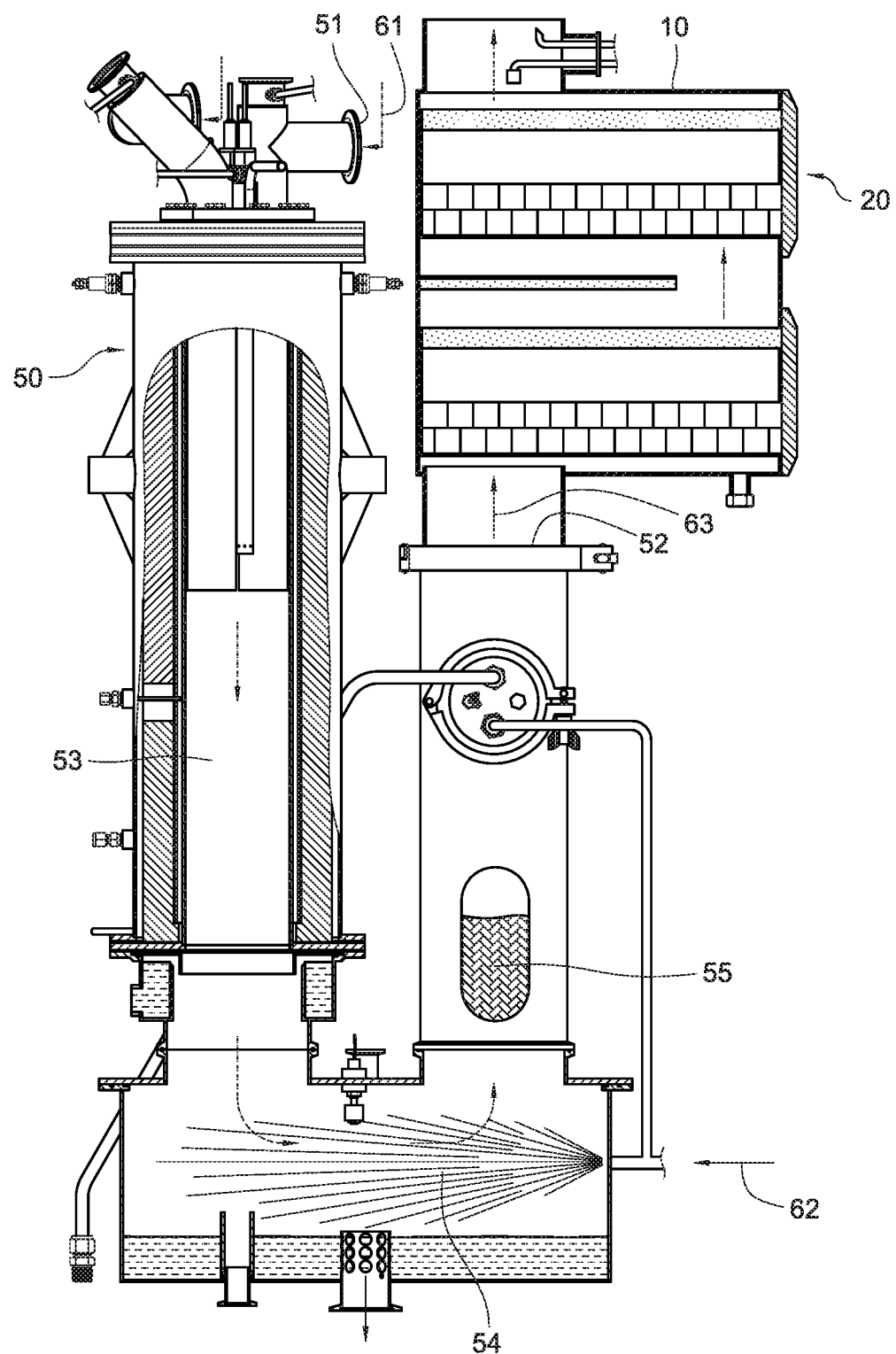
FIG. 5 a cross-section view showing the application of the dust filter mounted in the semiconductor waste gas treatment equipment of the present invention.

Please refer to FIG. 5 which demonstrates that the housing 10 is connected to a degassing hole 52 of a semiconductor waste gas treatment equipment 50. A heating decomposition zone 53, a first water washing area 54 and a second water-washing area 55 are sequentially disposed in the semiconductor waste gas treatment equipment 50. The waste gas 61 is injected into the semiconductor waste gas treatment equipment 50 via a gas inlet 51. When the waste gas 61 moves through the heating decomposition zone 53, the harmful substances in the waste gas 61 are catalyzed by using a high heat of a flame or a hot air to be decomposed into non-harmful substances. The waste gas 61 sequentially moves through the first water washing area 54 and the second water-washing area 55. Thus, water 62 is spraying in a homogeneous water curtain shape so as to generate a sufficient contact between the water 62 and the waste gas 61. The harmful substances in the gas soluble in the water 61 are dissolved in the water 62 to transform the waste gas 61 into non-harmful gas 63 and the non-harmful gas 63 enters the housing 10 via the degassing hole 52. The amount of the water molecular and the dusts containing in the non-harmful gas 63 decrease by moving through the main filtration box 20 in the housing 10 in order to be drained to the external atmosphere.

Although the present invention has been explained in relation to its preferred embodiment, it is to be understood that any other possible modifications and variations can be made without departing from the scope of the invention as hereinafter claimed.

I claim:

1. A dust filter mounted in a semiconductor waste gas treatment equipment comprising:
    a housing having a chamber in the housing for passing a gas containing a water molecule and a dust through, the housing forming an incoming gas end and an outgas end for communicating with the chamber, the incoming gas end connecting a degassing hole of a semiconductor waste gas treatment equipment, and the degassing hole connecting to a back end of at least one water washing area of the semiconductor waste gas treatment equipment; and
    at least one main filtration box which is removable from the chamber, at least one capturing ring and at least one filtering cotton for filtering the water molecule and the dust from the gas being disposed inside the at least one main filtration box, and the gas being sequentially passed through the capturing ring and the filtering cotton,
    wherein the at least one capturing ring is formed as a hollow metal tube structure,
    wherein a plurality of tongue strips integrally form on a circumferential wall of the at least one capturing ring and protrude toward a center of the at least one capturing ring to from a hollow tunnel at the center of the at least one capturing ring; and
    wherein the outgas end of the housing is provided with a clean dry air nozzle.

2. The dust filter mounted in the semiconductor waste gas treatment equipment as claimed in claim 1, wherein the plurality of tongue strips are of wavy shape.

3. The dust filter mounted in the semiconductor waste gas treatment equipment as claimed in claim 1, wherein an amount of the capturing ring is plural, and the plurality of the capturing rings are arranged in an array form.

4. The dust filter mounted in the semiconductor waste gas treatment equipment as claimed in claim 3, wherein the plurality of capturing rings are arranged in a double layer structure and the capturing rings of an upper layer are staggered with a lower layer of the capturing rings.

5. The dust filter mounted in the semiconductor waste gas treatment equipment as claimed in claim 1, wherein the main filtration box comprises a first filtration box and a second filtration box and the first filtration box and the second filtration box are spaced apart from each other in the chamber.

6. The dust filter mounted in the semiconductor waste gas treatment equipment as claimed in claim 5, wherein a spacer plate is disposed in the chamber and is located between the first filtration box and the second filtration box.

* * * * *